US012725170B2

(12) United States Patent
Paulraj et al.

(10) Patent No.: US 12,725,170 B2
(45) Date of Patent: Sep. 1, 2026

(54) MANAGING USE OF NON-STANDARD FEATURES OF DATA PROCESSING SYSTEM COMPONENTS USING OUT-OF-BAND METHODS

(71) Applicant: Dell Products L.P., Round Rock, TX (US)

(72) Inventors: Deepaganesh Paulraj, Bangalore (IN); Vinod Parackal Saby, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 115 days.

(21) Appl. No.: 18/785,224

(22) Filed: Jul. 26, 2024

(65) Prior Publication Data

US 2026/0030635 A1 Jan. 29, 2026

(51) Int. Cl.
*G06F 3/00* (2006.01)
*G06Q 30/018* (2023.01)

(52) U.S. Cl.
CPC .................................. *G06Q 30/018* (2013.01)

(58) Field of Classification Search
CPC .......... G06F 3/00; G06F 13/00; G06Q 30/018
USPC ............................................................ 710/36
See application file for complete search history.

(56) References Cited

U.S. PATENT DOCUMENTS 6,976,087 B1 12/2005 Westfall
7,024,593 B1 4/2006 Budd
7,089,335 B2 * 8/2006 Aiken .................... H04L 49/90 709/224
7,555,421 B1 6/2009 Beckett
7,974,286 B2 7/2011 Keohane et al.
8,633,801 B2 1/2014 Iwai
8,826,307 B2 * 9/2014 Nagampalli .......... G06F 13/102 719/321
9,563,766 B2 2/2017 Lim
10,027,678 B1 7/2018 Brandwine
10,033,756 B1 7/2018 Rangarajan
10,075,334 B1 9/2018 Kozura
11,252,192 B1 2/2022 Kwan
(Continued)

FOREIGN PATENT DOCUMENTS

EP 3699851 A1 8/2020

OTHER PUBLICATIONS

Integrated Dell Remote Access Controller 9 User's Guide Published Dec. 2021 (368 pages).

(Continued)

*Primary Examiner* — Christopher B Shin
(74) *Attorney, Agent, or Firm* — WOMBLE BOND DICKINSON (US) LLP

(57) ABSTRACT

Methods and systems for managing operation of a data processing system are disclosed. A management controller of the data processing system may screen commands issued by hardware resources of the data processing system to identify a command that implicates use of a non-standard feature of a channel card of the hardware resources. The command may not be natively executable by the channel card; therefore, the command may be modified by the management controller and a remote system to obtain a customized command that is natively executable by the channel card. The customized command may be used to initiate execution of the non-standard feature by the channel card to facilitate provisioning of a computer-implemented service.

20 Claims, 6 Drawing Sheets

(56) References Cited

U.S. PATENT DOCUMENTS

| | | | |
|---|---|---|---|
| 11,868,551 | B1 | 1/2024 | Pelissier |
| 2004/0025036 | A1 | 2/2004 | Balard |
| 2004/0128514 | A1 | 7/2004 | Rhoads |
| 2005/0048924 | A1 | 3/2005 | Nelson |
| 2005/0078088 | A1 | 4/2005 | Davis |
| 2005/0195975 | A1 | 9/2005 | Kawakita |
| 2006/0143543 | A1 | 6/2006 | Mandrell |
| 2006/0285502 | A1 | 12/2006 | Bigioi |
| 2007/0199047 | A1 | 8/2007 | Gibart |
| 2008/0226005 | A1 | 9/2008 | Kim |
| 2009/0014519 | A1 | 1/2009 | Singh |
| 2009/0069049 | A1 | 3/2009 | Jain |
| 2009/0094681 | A1 | 4/2009 | Sadler |
| 2009/0256717 | A1 | 10/2009 | Iwai |
| 2009/0265720 | A1 | 10/2009 | Nagampalli |
| 2011/0307712 | A1 | 12/2011 | Sakthikumar |
| 2012/0257118 | A1 | 10/2012 | Aotake |
| 2013/0117766 | A1 | 5/2013 | Bax |
| 2013/0283380 | A1 | 10/2013 | Thadikaran |
| 2014/0108693 | A1 | 4/2014 | Minezaki |
| 2015/0213355 | A1 | 7/2015 | Sharma |
| 2016/0050071 | A1 | 2/2016 | Collart |
| 2016/0142243 | A1 | 5/2016 | Karam |
| 2016/0173578 | A1 | 6/2016 | Sharma |
| 2017/0257365 | A1 | 9/2017 | Gonzalez |
| 2018/0069834 | A1 | 3/2018 | Angelsmark |
| 2018/0246732 | A1 | 8/2018 | Puri |
| 2019/0095372 | A1 | 3/2019 | Huang |
| 2019/0306018 | A1 | 10/2019 | Steverson |
| 2019/0342079 | A1 | 11/2019 | Rudzitis |
| 2020/0042709 | A1 | 2/2020 | Fu |
| 2020/0322176 | A1 | 10/2020 | Bhandari |
| 2020/0344325 | A1 | 10/2020 | Sarisky |
| 2020/0396128 | A1 | 12/2020 | Tseng |
| 2021/0097186 | A1 | 4/2021 | Mandal |
| 2021/0120104 | A1 | 4/2021 | Al-Mufti |
| 2021/0181817 | A1 | 6/2021 | Lu |
| 2022/0027165 | A1 | 1/2022 | Juan |
| 2022/0035685 | A1 | 2/2022 | Ghosh |
| 2022/0091744 | A1 | 3/2022 | Kutner |
| 2022/0100840 | A1 | 3/2022 | Shtalenkov |
| 2022/0121619 | A1 | 4/2022 | Sharma |
| 2022/0151022 | A1 | 5/2022 | Chikkur Dattatraya |
| 2022/0207463 | A1 | 6/2022 | Young |
| 2022/0303779 | A1 | 9/2022 | Boyapalle |
| 2022/0382866 | A1 | 12/2022 | Shroff |
| 2022/0382867 | A1 | 12/2022 | Shroff |
| 2022/0382912 | A1 | 12/2022 | Shroff |
| 2022/0385462 | A1 | 12/2022 | Shroff |
| 2023/0259632 | A1 | 8/2023 | Marciano |
| 2023/0328037 | A1 | 10/2023 | Sankaranarayanan |
| 2024/0095328 | A1 | 3/2024 | Ponsini |
| 2024/0267251 | A1 | 8/2024 | Mishelevich |
| 2025/0148078 | A1 | 5/2025 | Lal |
| 2025/0200227 | A1 | 6/2025 | Shroff |
| 2025/0200583 | A1 | 6/2025 | Wheeler |
| 2025/0272363 | A1 | 8/2025 | Pathirana |
| 2025/0272538 | A1 | 8/2025 | Pathirana |
| 2026/0030356 | A1 | 1/2026 | Paulraj |

OTHER PUBLICATIONS

Cycuity, “Detect and Prevent Security Vulnerabilities in your Hardware Root of Trust,” 2022. Web Page <https://cycuity.com/wp-content/uploads/2022/06/Cycuity_White-Paper_Detect-Security-Vulnerabilities-HRoT.pdf> accessed on Jul. 23, 2024 (17 Pages).

Elmaghbub, Abdurrahman, et al., “Domain-Agnostic Hardware Fingerprinting-Based Device Identifier for Zero-Trust IoT Security,” IEEE Wireless Communications 31.2 (2024) (7 Pages).

Rostami, Mohamadreza, et al. “Beyond random inputs: A novel ml-based hardware fuzzing.” 2024 Design, Automation & Test in Europe Conference & Exhibition. IEEE. (2024) (6 Pages).

Gaikwad, Pravin, et al. “Third-party hardware IP assurance against Trojans through supervised learning and post-processing.” arXiv preprint arXiv:2111.14956. IEEE. (2021) (13 Pages).

* cited by examiner

MANAGING USE OF NON-STANDARD FEATURES OF DATA PROCESSING SYSTEM COMPONENTS USING OUT-OF-BAND METHODS

FIELD

Embodiments disclosed herein relate generally to managing operation of data processing systems. More particularly, embodiments disclosed herein relate to systems and methods to manage use of non-standard features of components of the data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
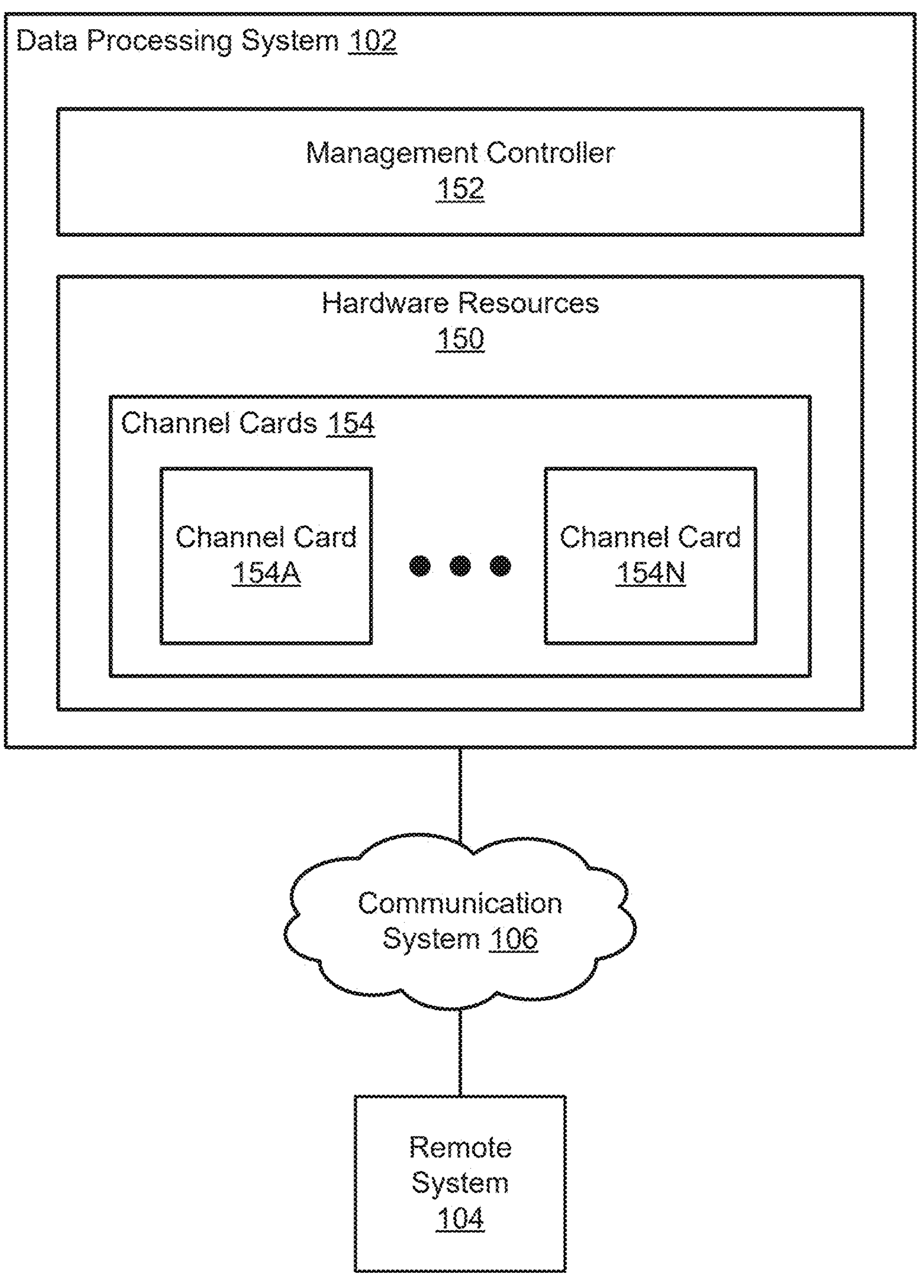
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a data processing system. The data processing system may provide computer-implemented services. To provide the computer-implemented services, hardware resources of the data processing system such as memory, processors, channel cards, and/or other hardware components may operate in cooperation with one another. During cooperative operation, some hardware resources may attempt to access information stored by other hardware resources, may attempt to issue commands to the other hardware resources, and/or may otherwise attempt to activate functions/features of the other hardware resources.

For example, a processor of the data processing system may issue commands to a channel card of the data processing system in order to facilitate provision of the computer-implemented services. The channel card may include, for example, a graphics card, a sound card, a storage card, and/or other types of hardware components of the data processing system that may be added, removed and/or replaced. To invoke functionality of the channel card, the processor may issue commands recognized by the channel card. These commands may be defined by configuration settings of and/or software hosted by the hardware resources (firmware, drivers, etc.) that support the cooperative operation of the hardware resources.

Over time (e.g., after an end user obtains the data processing system from the manufacturer), hardware components of the data processing system may be modified. For example, portions of the hardware resources may be replaced, added, removed, and/or otherwise modified to improve performance of the data processing system. However, if a hardware component is modified, then any software and/or configuration settings associated with the modified hardware component may be required to be updated so that the hardware resources may continue to operate cooperatively.

For example, a user may replace a stock channel card (e.g., a standard channel card) that was manufactured by the manufacturer of the data processing system with an aftermarket channel card (e.g., a non-standard channel card manufactured by an entity different to the manufacturer of the data processing system). The aftermarket channel card may be a configurable hardware component and may include different (e.g., additional) functionality from the stock channel card, the additional functionality being enabled by firmware installed on the aftermarket channel card. For example, the aftermarket channel card may include standard features (e.g., known functionality, based on a current or preceding industry standard with which the aftermarket channel card is compliant) and non-standard features.

The non-standard features may include functionality not known by the stock hardware components, and therefore may not be natively invokable using commands issued by the stock hardware components and/or software hosted thereon. For example, a command issued by the stock hardware resources that implicates use of a non-standard feature of the aftermarket channel card may not be natively executable by the aftermarket channel card (e.g., the command may not include instructions for activating the non-standard feature of the channel card).

In order to utilize the non-standard features of a non-standard channel card, operation of the hardware resources may be required to be reconfigured and/or otherwise updated so that the hardware resources may issue commands that are natively executable by the non-standard channel card. This may be achieved, for example, using third-party software to perform software, firmware, and/or driver updates. A third-party may include any entity (e.g., a vendor or manufacturer of a hardware component) other than the manufacturer of the data processing system.

However, the third-party software required to utilize the non-standard features may include proprietary information (e.g., proprietary logic, such as algorithms, code, concepts, etc.) that the third-party may wish to protect; therefore, the third-party may limit access to the third-party software. For example, to avoid back-engineering of the proprietary information, the third-party may not provide the third-party software to the data processing system for local execution. This limited access to the third-party software may limit access to the non-standard features of the channel card, thereby decreasing a quality of the computer-implemented services. For example, the data processing system may be unable to provide the computer-implemented services as desired by a downstream consumer of the computer-implemented services (e.g., a user of the data processing system).

Thus, to improve the likelihood of providing the desired computer-implemented services in view of non-standard channel cards of the data processing system, commands issued to the (non-standard) channel cards may be managed, in part, by a remote system and using out-of-band methods. To do so, the data processing system may include out-of-band (hardware) components (e.g., a management controller). The out-of-band components may operate independently from in-band components (e.g., the hardware resources) of the data processing system.

The out-of-band components may communicate with the remote system via out-of-band communication channels that circumvent the hardware resources (e.g., without introducing security risks to the hardware resources). For example, the management controller may provide commands that implicate use of a non-standard feature of the channel card to the remote system via the out-of-band communication channel. The remote system may host third-party proprietary software adapted to modify (e.g., interpret and convert) the commands. The remote system may modify the commands (e.g., using the third-party proprietary software) and may provide the modified commands to the management controller via the out-of-band communication channel. The modified commands may be natively executable by the channel cards and may invoke non-standard features of the channel cards.

By doing so, commands issued to hardware components of the data processing system may be managed automatically and remotely so that non-standard functionality of the hardware components is more likely to be supported, and proprietary information of the third-party software is more likely to be protected while providing the computer-implemented services.

In an embodiment, a method for managing operation of a data processing system is provided. The method may include: screening, by a management controller of the data processing system, commands issued by hardware resources of the data processing system to identify a command that implicates use of a non-standard feature of a channel card of the hardware resources; modifying, by the management controller and a remote system, the command to obtain a non-standard feature customized command that is natively executable by the channel card; and, initiating, by the management controller, execution of the non-standard feature customized command by the channel card to facilitate provisioning of a computer-implemented service.

The command may not be natively executable by the channel card, and the management controller may be unable to obtain the non-standard feature customized command without cooperation of the remote system.

The remote system may be adapted to interpret and convert the command to obtain the non-standard feature customized command. The remote system may be a system operated by a vendor that manufactured the channel card. The command may be converted to the non-standard feature customized command using proprietary logic maintained and controlled exclusively by the remote system.

Other commands of the commands may be natively executable by the channel card, and the management controller may be adapted to allow direct processing of the other commands by the channel card without modification.

The non-standard feature may be a capability of the channel card that is additional to those of a standard for a type of the channel card.

Screening the commands may include comparing each of the commands to a set of types of commands that are compliant with the standard for the type of the channel card. In an instance of the comparing where the command is not of a type that is a member of the set of the types of the commands, the method may include concluding that the command implicates the use of the non-standard feature.

Modifying the command may include: sending, by the management controller, at least the command to the remote system via an out-of-band channel; and, receiving, by the management controller, the non-standard feature customized command.

Initiating execution of the non-standard feature customized command may include: transparently, to the channel card, inserting the non-standard feature customized command into an execution flow for commands issued to the channel card.

The management controller may be separate from and tasked with managing operation of the hardware resources, and the management controller may monitor at least a portion of the hardware resources to identify and intercept the issued commands transparently to the hardware resources.

The method may further include, prior to screening the commands and by the management controller: registering the management controller with the remote system with respect to the channel card to facilitate the modifying of the command; and, establishing, by the management controller and with the remote system, non-standard feature preferences for the channel card, the non-standard feature preferences limiting at least one non-standard feature of the channel card from use by the remote system during the modifying of the command.

The non-standard feature preferences may be based on user input obtained during an interaction between the management controller and a user of the data processing system, the user desiring the computer-implemented service to be provided.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide computer-implemented services. The computer-implemented services may include any type and quantity of computer-implemented services. For example, the computer-implemented services may include data storage services, instant messaging services, database services, data generation services, and/or any other type of service that may be implemented with a computing device. The computer-implemented services may be provided, at least in part, using various components of hardware resources of the data processing system, such as channel cards (e.g., graphics cards, network interface cards (NICs), accelerator cards, expansion cards).

To provide the computer-implemented services, hardware components of the data processing system may interact with one another cooperatively. For example, the computer-implemented services may require cooperative interaction between processors, memory modules, storage devices, and/or the channel cards. Based on these interactions, the hardware components may support execution of any number and/or types of software components (e.g., applications hosted by the hardware components), and, in some combination, the hardware and software components may provide for various types of computer-implemented services.

The interactions between the hardware and/or software components may depend on the presence of appropriate firmware, drivers, configuration data, and/or configuration settings of the data processing system that support the cooperative interactions. For example, a channel card of the data processing system may require that specialized firmware be installed to the data processing system, and the specialized firmware may define commands that, when issued to the channel card, may activate a feature of the channel card necessary for providing desired computer-implemented services. Thus, during setup (e.g., manufacturing) of the data processing systems, the appropriate firmware, drivers, configuration data, and/or configuration settings that define commands for invoking functionality of existing (e.g., standard, stock) hardware components of the data processing system may be installed.

Over time (e.g., after manufacturing or setup), hardware components such as channel cards may be modified (e.g., by an end user). For example, a stock channel card may be replaced with an aftermarket channel card, and/or aftermarket channel cards may be added to the data processing system. Functionality of the aftermarket channel cards may vary to a high degree depending on their vendor (e.g., manufacturer of the channel card) and/or due to the programmable nature of some channel cards (SmartNICs, data processing unit (DPU) cards, etc.).

For example, channel cards (e.g., non-standard channel cards) may include programmable platform devices capable of performing various functions in various different ways and/or some may require special methods of communication (e.g., specialized application programming interfaces (APIs)). In other words, some functionality/features of the channel cards may (i) not adhere to an industry standard for similar types of channel cards, (ii) may be in addition to the functionality specified by the industry standard, and/or (iii) may otherwise require specialized or unusual information to utilize such functions/features. These features may be referred to as non-standard features. Therefore, the host system (e.g., the stock hardware components and software hosted thereon, added by the manufacturer during manufacturing and that may only include capabilities to natively interact with industry standard functionalities/features) may be unable to natively invoke the non-standard features of the channel cards without using third-party software (e.g., proprietary drivers and/or APIs for the channel cards).

For example, third-party software for (non-standard) channel cards may be adapted to interpret and convert commands issued by hardware resources of the data processing system to obtain customized commands. The customized commands may be natively executable by the channel cards and may invoke the non-standard features of the channel cards. However, when performing this functionality, the third-party software may use proprietary information (e.g., proprietary logic such as concepts, ideas, algorithms, and/or other secrets), and therefore access to the third-party software may be restricted (e.g., by the third party) in order to protect the proprietary information.

To protect the proprietary information, the third-party may not allow data processing systems operated by other entities certain types of access to the third-party software. For example, the third-party may not allow a data processing system local access (e.g., local storage and/or local execution) of the third-party software to avoid exposure (e.g., via analysis and/or reverse engineering of proprietary code) of the proprietary information. Therefore, to avoid exposure of the proprietary information, the third-party software may be hosted by a system managed by the third-party (or another entity authorized to do so), and the system may provide services that facilitate use of the non-standard features of the channel cards.

In general, embodiments disclosed herein may provide methods, systems, and/or devices for facilitating use of non-standard features of channel cards in a manner that protects proprietary information required to do so. To facilitate use of the non-standard features, the data processing system may include out-of-band (hardware) components, such as a management controller. The management controller may be separate from and tasked with managing operation of the hardware resources of the data processing system and may be tasked with managing commands issued to the channel cards cooperatively with a remote system (e.g., managed by the third party) that hosts the third-party software for the channel cards.

For example, the management controller may screen commands issued by the hardware resources of the data processing system to a non-standard channel card of the data processing system to identify whether command conversion services offered by the remote system are required (e.g., whether any of the commands invoke non-standard features of the channel card). When required, the management controller may communicate with the remote system via out-of-band communication channels to: (i) provide the commands to the remote system and (ii) obtain modified (e.g., converted) commands that invoke the non-standard features and that are natively executable by the channel card. The remote service may be used by the management controller, independently and/or transparently from hardware components of the host system.

By doing so, non-standard features of channel cards of a data processing systems may be utilized using third-party software in a manner that protects proprietary information of the third-party software from unwanted exposure. The system may do so by accessing a service that is provided using the third-party software via a remote system operated by an entity authorized to access the proprietary information. The service may be accessed using out-of-band methods (e.g., using out-of-band components and via out-of-band communication channels of the data processing system) in order to (i) reduce resource consumption by the hardware resources, and/or (ii) reduce the likelihood of compromise of the host system in view of using the third-party service.

To provide the above-mentioned functionality, the system of FIG. 1A may include data processing system 102, remote system 104, and communication system 106. Data processing system 102 may include hardware resources 150 and management controller 152. The system, any components thereof, and/or any other types of devices or components not shown in FIG. 1A may perform all, or a portion of the computer-implemented services independently and/or cooperatively. Each of these components is discussed below.

Hardware resources 150 may include any number of hardware components (e.g., memory, processors, channel cards). For example, hardware resources 150 may include any number of channel cards 154 (e.g., 154A-154N). Channel cards 154 may include expansion cards and/or adapter cards that may add specific functions/features to data processing system 102. Each channel card of channel cards 154 may be designed to perform a specific task and/or provide additional capabilities to data processing system 102 (e.g., beyond what other hardware components such as a motherboard of data processing system 102 may offer). For example, channel cards 154 may include graphics processing units (GPUs), network interface cards (NICs), storage controller cards, wireless network cards, Universal Serial Bus (USB) expansion cards, and/or other types of cards.

Channel cards 154 may include any number of standard channel cards (e.g., installed by a manufacturer of data processing system 102) and/or non-standard channel cards (e.g., added by a user of data processing system 102) and, therefore, may include a heterogeneous set of channel cards. Channel cards 154 may function in cooperation with other components of hardware resources 150.

Hardware resources 150 may host applications and/or other software, and store and/or execute instructions provided by the applications and/or the software in order to facilitate provision of a computer-implemented service. For example, an operating system hosted by hardware resources 150 may manage interactions between channel cards 154 and other hardware components (e.g., processors, storage devices, memory modules, etc., not shown) of hardware resources 150. For example, a processor of data processing system 102 may interact with channel card 154A of data processing system 102 by issuing instructions (e.g., commands) to channel card 154A. Upon reading and/or executing a command, channel card 154A may perform a desired function in cooperation with the processor and/or other hardware components of hardware resources 150.

To support cooperative interactions between non-standard channel cards and other hardware components of hardware resources 150, management controller 152 may manage interactions between components of hardware resources 150. For example, management controller 152 may manage (e.g., screen) commands issued to any non-standard channel cards of channel cards 154 by a processor of hardware resources 150 using a service. To manage the interactions between the components of hardware resources 150, management controller 152 may establish connections with remote system 104.

Remote system 104 may include any number of systems (e.g., data processing systems) remote to data processing system 102 and may be operated and/or managed by a manufacturer of channel cards different to a manufacturer of data processing system 102 (e.g., a third-party). Remote system 104 may host proprietary software that uses proprietary logic to interpret and convert commands issued by hardware resources 150 of data processing system 102, in a manner that facilitates use of non-standard features of any of channel cards 154.

For example, channel card 154A may include a non-standard channel card with non-standard features not natively invokable by commands issued by hardware resources 150. Remote system 104 may host third-party software that is proprietary to a manufacturer of a channel card 154A (e.g., the third party) and remote system 104 may provide a service (e.g., a Cloud service) for modifying commands issued by hardware resources 150. The modified commands may include customized commands recognized by channel card 154A that invoke the non-standard features. The service (e.g., a third-party service) may be accessed by data processing system 102 using out-of-band methods (e.g., by out-of-band components via out-of-band communication channels with the remote system).

To establish services for invoking non-standard features of a non-standard channel card, management controller 152 may (i) register itself (e.g., with respect the channel card) with remote system 104 in order to access command modification services offered by remote system 104, (ii) establish non-standard feature preferences (e.g., based on user input) for the channel card for configuration of the command modification services (e.g., to limit use of one or more of the non-standard features), and/or (iii) perform other actions. For example, commands managed by management controller 152 may be modified via interactions over the out-of-band communication channels established with the third-party service, and the third-party service may provide modified commands generated in accordance with the non-standard feature preferences. Refer to the discussion of FIG. 2A for more details regarding registration and configuration of third-party services.

To manage command processing for the non-standard channel card, management controller 152 may (i) screen commands destined to the (non-standard) channel card to identify whether the commands implicate use of a non-standard feature of the channel card, (ii) modify, using the service provided by remote system 104, the commands to obtain non-standard feature customized commands capable of invoking the desired non-standard features, (iii) provide the non-standard feature customized commands to the channel card for execution by the channel card, and/or (vi) perform other operations for managing operation of data processing system 102 and/or components thereof. Refer to the discussion of FIG. 2B for more details regarding command processing using a remote system.

To modify the commands using the service provided by remote system 104, management controller 152 may (i) send, via the out-of-band communication channel, the commands to remote system 104 and (ii) receive, via the out-of-band communication channel and from remote system 104, the non-standard feature customized commands.

By obtaining the non-standard feature customized commands from remote system 104 (rather than data processing system 102 hosting the third-party software locally and risking discovery of proprietary logic of the third-party software), proprietary information of the third-party software may be more likely to be protected, and non-standard features of the channel cards may be utilized.

Management controller 152 may be distinct from and/or may operate independently from hardware resources 150. To facilitate cooperation between hardware resources 150 and management controller 152, hardware resources 150 may host an agent for management controller 152 (not shown). The agent (e.g., a software program) may facilitate communication between management controller 152 and hardware resources 150. Refer to the discussion of FIG. 1B for more information regarding the functionality of management controller 152.

Figure 2A:
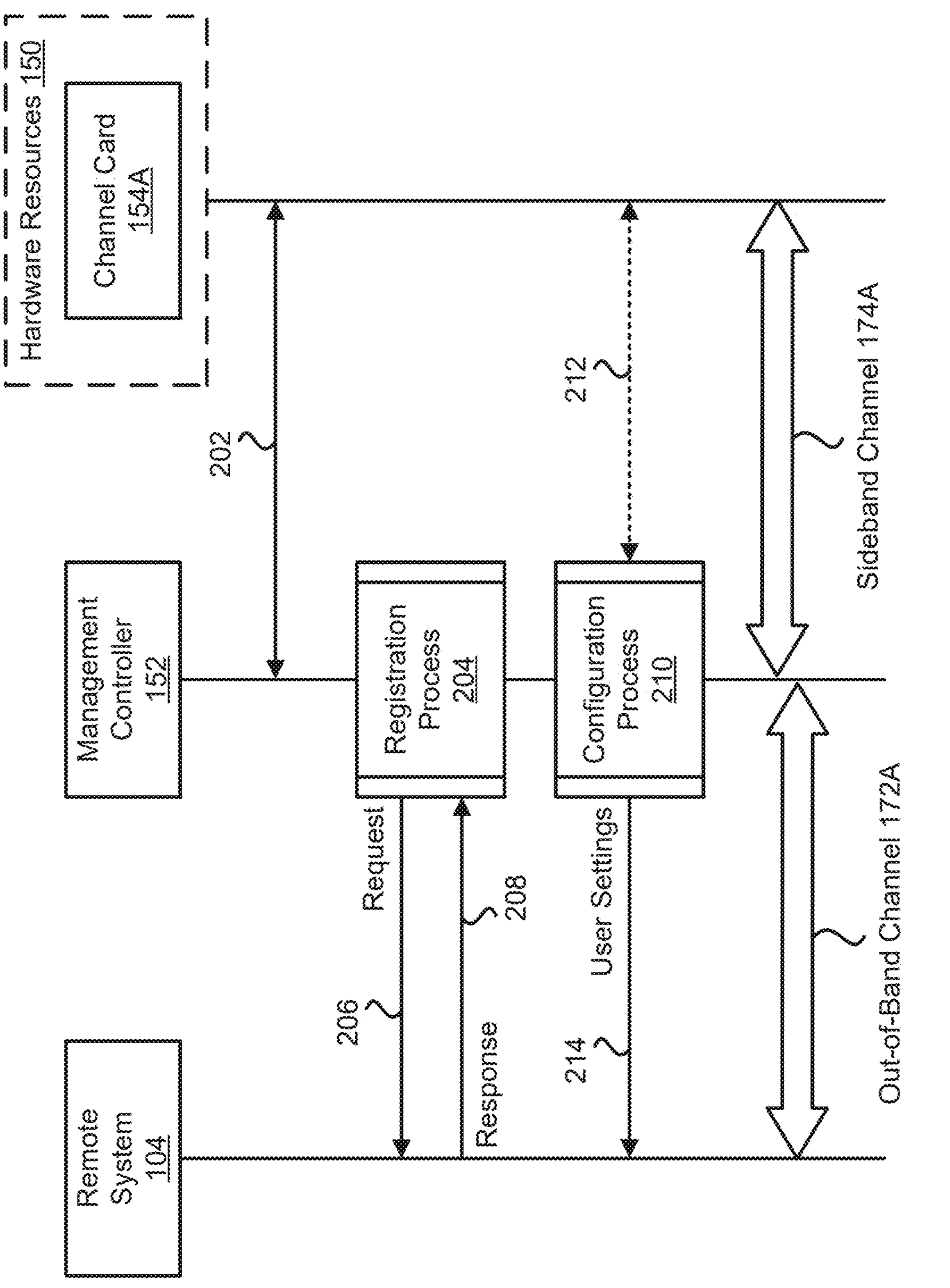
FIGS. 2A-2B show interaction diagrams in accordance with an embodiment.
Figure 2B:
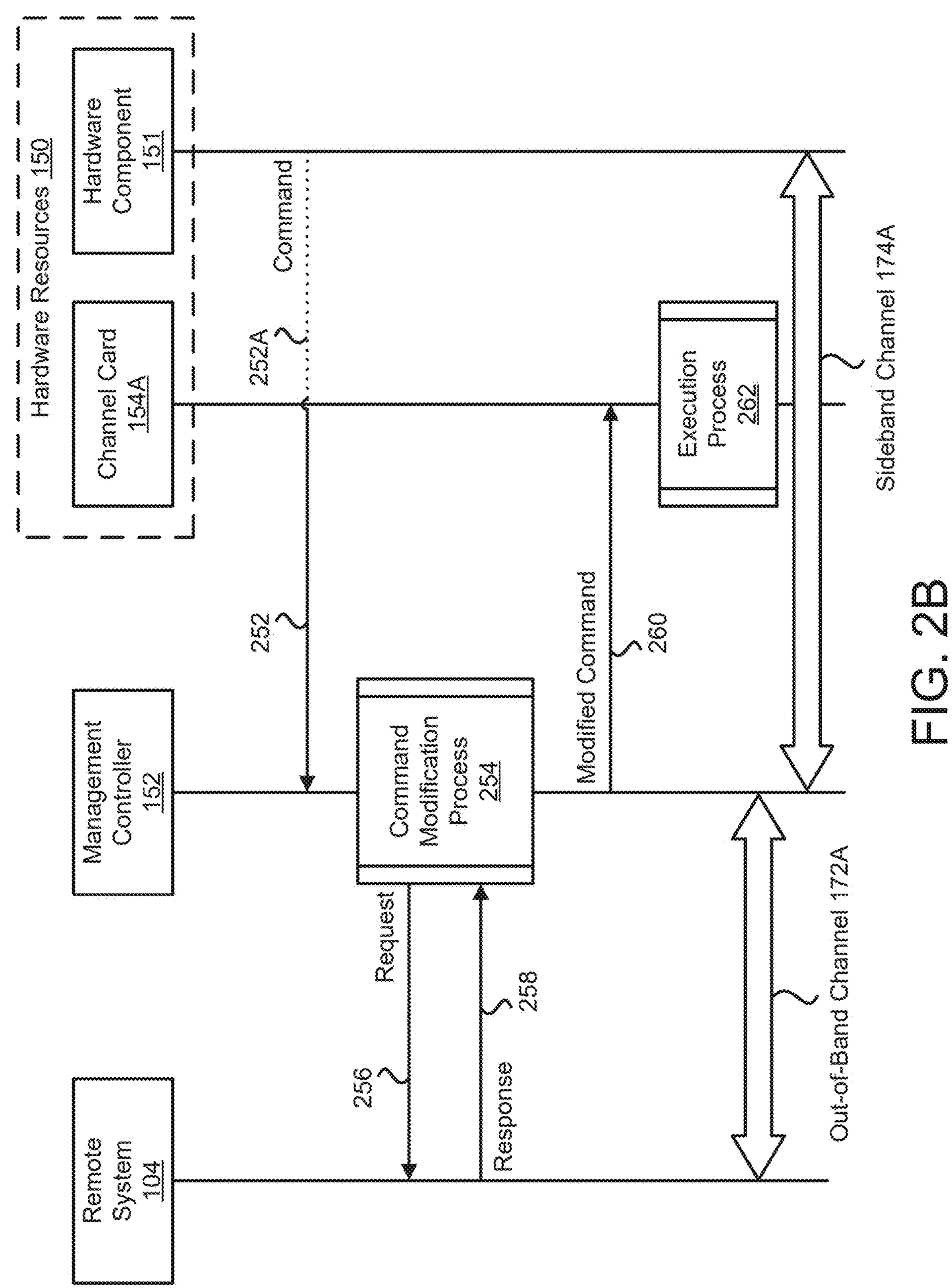
Figure 3:
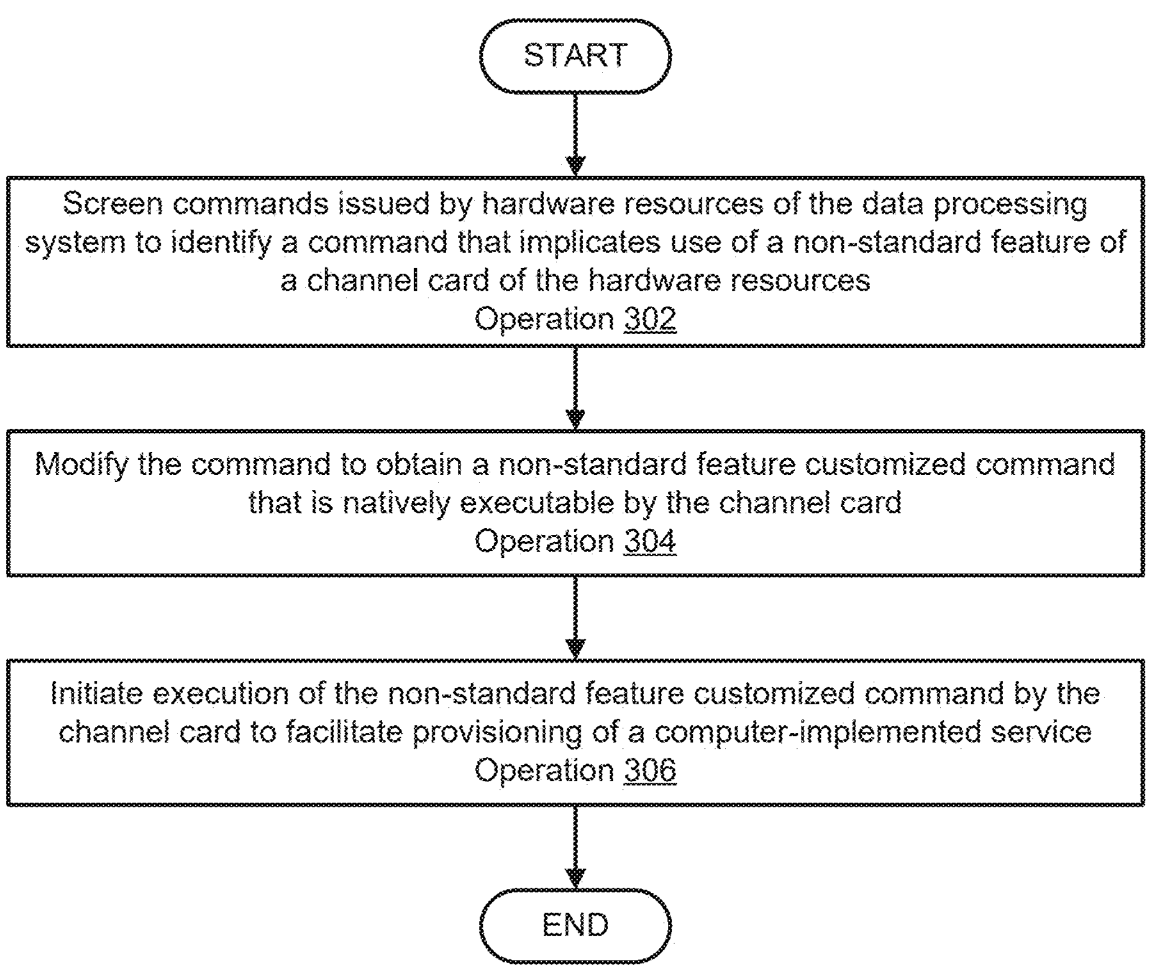
FIG. 3 shows a flow diagram illustrating a method in accordance with an embodiment.

When providing their functionality, any of data processing system 102, remote system 104, and/or components thereof may perform all, or a portion of the actions and methods illustrated in FIGS. 2A-3.

Any of data processing system 102 (and/or components thereof) and remote system 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

Any of the components illustrated in FIG. 1A may be operably connected to each other (and/or components not illustrated) with communication system 106. Communication system 106 may facilitate communications between the components of FIG. 1A. In an embodiment, communication system 106 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1A as including a limited number of specific components, a system in accordance with an embodiment may include fewer, additional, and/or different components than those illustrated therein.

Figure 1B:
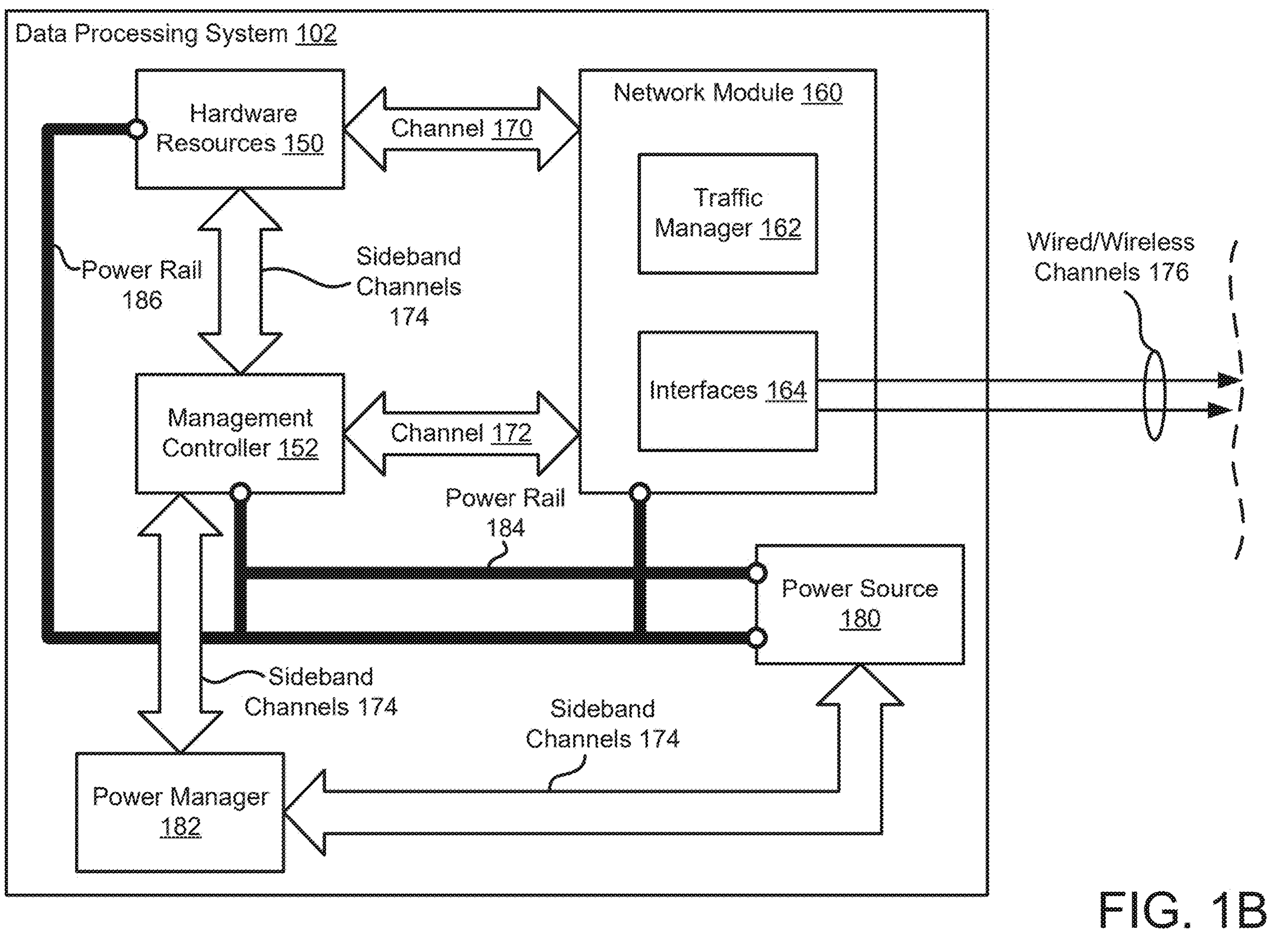
FIG. 1B shows a block diagram illustrating components of a data processing system in accordance with an embodiment.

Turning to FIG. 1B, a diagram illustrating components of a data processing system in accordance with an embodiment is shown. The components of the data processing system shown in FIG. 1B may be similar to those of data processing system 102 of in FIG. 1A.

To provide computer-implemented services, data processing system 102 may include any quantity of hardware resources 150. Hardware resources 150 may be in-band hardware components, and may include a processor operably coupled to memory, storage, channel cards, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102) to another device via any number of intermediate networks (e.g., via wired/wireless channels 176 that are part of the networks).

To reduce the likelihood of the applications and/or other in-band entities from being indirectly compromised, data processing system 102 may include management controller 152 and network module 160. Each of these components of data processing system 102 is discussed below.

Management controller 152 may be implemented, for example, using a system on a chip or other type of independently operating computing device (e.g., independent from the in-band components, such as hardware resources 150, of a host data processing system 102). For example, management controller 152 may host third-party software (e.g., vendor software for an aftermarket channel card of data processing system 102) separately from hardware resources 150 in order to avoid indirect compromise of software and/or network stacks hosted by hardware resources 150 by potentially malicious third-party software. Management controller 152 may provide various management functionalities for data processing system 102. For example, management controller 152 may monitor various ongoing processes performed by the in-band components, may manage power distribution, may participate in thermal management, and/or other may perform other functions, such as identifying and/or intercepting commands sent between the in-band components.

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels such as 174A shown in FIG. 2A). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, sideband channels 174 may facilitate communications between management controller 152 and hardware resources 150 so that management controller 152 may identify and/or intercept commands issued by a processor of hardware resources 150 destined for a channel card of hardware resources 150. In addition, when management controller 152 obtains modified commands (e.g., from a remote system that provides command modification services, such as remote system 104), management controller 152 may use sideband channels 174 to provide the modified commands to the channel card (and/or another hardware component of hardware resources 150).

To reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 102 via separate channels (e.g., 172, 172A shown in FIG. 2A) from the in-band components, and may implement or otherwise utilize a distinct and independent network stack (e.g., TCP/IP). Consequently, management controller 152 may communicate with other devices independently of any portion of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 102 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 102, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components. For example, when performing command modification, management controller 152 may communicate with a remote system (e.g., 104) via out-of-band communication channels (e.g., channel 172) independently from and/or without traversing a network stack of hardware resources 150. By doing so, management controller 152 may request, obtain, and/or provide modified commands transparently to the host system (e.g., hardware resources 150).

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a Wi-Fi card, a wireless local area network card, a wired local area network card, an optical communication card, and/or other types of communication components. These components may support any number of wired/wireless channels 176.

Thus, from the perspective of an external device, the in-band components and the out-of-band components of data processing system 102 may appear to be two independent network entities that may independently addressable and otherwise unrelated to one another.

To facilitate management of data processing system 102 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 102 may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) may manage power from power source 180, and power may be supplied via the power rails. Management controller 152 may cooperate with power manager 182 to manage supply of power to these power domains. Management controller 152 may communicate with power manager 182 via sideband channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

To further clarify embodiments disclosed herein, interaction diagrams in accordance with an embodiment are shown in FIGS. 2A-2B. These interaction diagrams may illustrate how data may be obtained and used within the system of FIGS. 1A-1B. In the examples shown in FIGS. 2A-2B, a data processing system (e.g., 102) may include components such as hardware resources 150 and management controller 152. As shown with respect to FIG. 2B, hardware resources

150 may include hardware component 151 and channel card 154A. The components of the data processing system may be similar to and/or include functionality similar to those described with respect to FIGS. 1A-1B.

In the interaction diagrams, processes performed by and interactions between components of a system in accordance with an embodiment are shown. In the diagrams, components of the system are illustrated using a first set of shapes (e.g., 104, 152), located towards the top of the figure. Lines descend from these shapes. Processes performed by the components of the system are illustrated using a second set of shapes (e.g., 204, 210, etc.) superimposed over these lines.

Interactions (e.g., communication, data transmissions, etc.) between the components of the system are illustrated using a third set of shapes (e.g., 202, 206) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur. Lines drawn in dashing (e.g., 252A) may indicate that the corresponding interactions are optional and/or may not occur during operation of the system for various reasons.

Generally, the processes and interactions are temporally ordered in an example order, with time increasing from the top to the bottom of each page. For example, the interaction labeled as 206 may occur prior to the interaction labeled as 208. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate flows of data and processing of data that may occur when managing use of non-standard features of hardware components of a data processing system.

In the example shown in FIG. 2A, hardware resources 150 of the data processing system may include any number of channel cards. For example, channel card 154A may include a non-standard channel card installed to the data processing system after its time of manufacturing and/or after a recent setup of the data processing system; therefore, the data processing system may not include appropriate firmware, drivers, and/or other software necessary to utilize at least a portion of features offered by the channel card 154A.

To identify presence of channel card 154A, management controller 152 may communicate with hardware resources 150. For example, at interaction 202, data may be exchanged between any of hardware resources 150 and management controller 152 by (i) transmission via a message, (ii) storing in a storage with subsequent retrieval by the recipient (e.g., either management controller 152 or hardware resources 150), (iii) a publish-subscribe system where one of management controller 152 and hardware resources 150 subscribes to updates from the other thereby causing a copy of the data to be propagated to the recipient, and/or (iv) other processes. The data exchange may occur, for example, via sideband channel 174A (e.g., of sideband channels 174 of FIG. 1B).

For example, during startup of the data processing system, management controller 152 may identify that channel card 154A is present in the system (e.g., during a secured component verification process and/or via a notification from a startup management entity of the data processing system). Management controller 152 may be provided with (and/or may request) identifying information for channel card 154A such as a model number, a card type, etc. The identifying information may indicate that channel card 154A is manufactured by a vendor different to that of the data processing system and/or that functionality of channel card 154A may include non-standard features not natively invokable by hardware resources 150 (e.g., using software hosted by hardware resources 150).

For example, hardware resources 150 may include a processor, and channel card 154A may include a performance sound card. Prior to a user installing the performance sound card to the data processing system, the data processing system may have been configured to use an integrated sound card for audio transmission. The integrated sound card may include standard features such as generating and recording audio; therefore, the processor may be configured to issue commands for generating and/or recording audio. However, the performance sound card may include non-standard features in addition to the standard features, such as data caching and/or data processing, and the processor may not be configured to issue such commands.

Thus, to manage use of non-standard features of channel card 154A, management controller 152 may perform registration process 204. During registration process 204, management controller 152 may register itself with remote system 104 in order to obtain services that facilitate functionality of channel card 154A. For example, remote system 104 may provide a service for modifying commands for channel card 154A to obtain non-standard feature customized commands usable to invoke the non-standard features. Management controller 152 may register itself and/or the data processing system as a trusted device that includes channel card 154A in order to access the service.

To perform the registration, during registration process 204, management controller 152 may obtain a request for registration. The request for registration may include, for example, (i) information regarding the data processing system and/or components thereof (e.g., identifying information for management controller 152 and channel card 154A), (ii) information regarding requested services (e.g., command modification services) and/or requested software (non-proprietary software usable for facilitating the command modification services), and/or (iii) other information (e.g., cryptographic information, such as a signature).

At interaction 206, the request may be provided to remote system 104 by management controller 152 by (i) transmission via a message, (ii) storing in a storage with subsequent retrieval by remote system 104, (iii) a publish-subscribe system where remote system 104 subscribes to updates from management controller 152 thereby causing a copy of the request to be propagated to remote system 104, and/or (iv) other processes. The request may be provided, for example, via out-of-band channel 172A (e.g., a communication channel similar to channel 172 of FIG. 1B). By providing the request to remote system 104, remote system 104 may register the data processing system as trusted and may provide third-party software services.

Remote system 104 may host third-party software for various channel cards (e.g., software proprietary to the vendor of the channel cards) and/or remote system 104 may be operated by the third-party (e.g., the vendor of channel cards). Upon obtaining the request, remote system 104 may (i) perform various checks (e.g., security checks, verification of the provided cryptographic information) before registering management controller 152 as a trusted device for obtaining services, and (ii) identify services and/or software associated with channel card 154A requested by management controller 152.

Remote system 104 may respond to the request from management controller 152, for example, confirming (or denying) the registration. The confirmation (or denial) of the registration may be provided to management controller 152 via a response. In some cases, if management controller 152 is successfully registered as trusted, then the response may include software usable for facilitating the services. For example, the software may include flow control software that may be installed locally on management controller 152 to track and order (e.g., reorder) commands received from remote system 104 before issuing (e.g., forwarding) the commands to channel card 154A. In other cases, management controller 152 may not require additional software for facilitating the services provided by remote system 104. The response may also include information regarding non-standard features of channel card 154A, such as a list of the non-standard features.

At interaction 208, the response to the request may be provided to management controller 152 by remote system 104 via out-of-band channel 172A by (i) transmission via a message, (ii) storing in a storage with subsequent retrieval by management controller 152, (iii) a publish-subscribe system where management controller 152 subscribes to updates from remote system 104 thereby causing a copy of the response to be propagated to management controller 152, and/or (iv) other processes. Upon obtaining the response (e.g., if management controller 152 has been successfully registered, then) management controller 152 may manage functionality of channel card 154A.

If management controller 152 is successfully registered as managing functionality of channel card 154A, then, over time, management controller 152 may obtain update notifications from remote system 104 (e.g., not shown) regarding channel card 154A. For example, remote system 104 may notify management controller 152 when firmware updates are available for channel card 154A.

To manage functionality of channel card 154A, management controller may perform configuration process 210. During configuration process 210, non-standard feature preferences may be established for channel card 154A. The non-standard feature preferences may limit use of one or more non-standard features of channel card 154A. For example, by default, remote system 104 may allow use of all non-standard features of channel card 154A when providing command modification services. Therefore, the non-standard feature preferences may be used by remote system 104 to limit at least one non-standard feature of channel card 154A from use when providing the command modification services.

The non-standard feature preferences may be based on user input obtained during an interaction between management controller 152 and a user of the data processing system. The user may include an administrator and/or other entity desiring computer-implemented service to be provided. Therefore, during configuration process 210, user input regarding the non-standard features may be obtained. To do so, management controller 152 may communicate with a portion of hardware resources 150. For example, management controller 152 may provide instructions for obtaining user input to a processor of hardware resources 150. The instructions may be provided to hardware resources 150 by management controller 152 at interaction 212 using methods similar to those described with respect to interaction 202 and/or by other methods.

For example, management controller 152 may use a sideband channel (e.g., sideband channel 174A) to instruct its host system (e.g., hardware resources 150) to generate a pop-up interface (e.g., a command line interface (CLI), a graphical user interface ((GUI)) through which the user may provide user input. For example, the GUI may display a list of the non-standard features (e.g., and/or standard features) of channel card 154A, and the user may be prompted to make a selection regarding use of the non-standard features (e.g., and/or standard features).

The user may select a portion of the non-standard and/or standard features of channel card 154A. The user's selection, along with other information (e.g., identifying information for the user and/or other metadata), may be included in a data package (e.g., the user input), and the data package may be provided to (or collected by) management controller 152 from hardware resources 150 at interaction 212 using methods similar to those described with respect to interaction 202 and/or by other methods.

To configure service settings managed by remote system 104, during configuration process 210 management controller 152 may forward information from the data package to remote system 104. For example, management controller 152 may provide user settings to remote system 104. The user settings may indicate the user's preference for which non-standard features are to be used when computer-implemented services are provided using channel card 154A.

At interaction 214, the user settings may be provided to remote system 104 using methods similar to those described with respect to interaction 206 (e.g., via out-of-band channel 172A). Upon obtaining the user settings, remote system 104 may update command modification service settings so that commands are modified in accordance with the user's preference. As a result, services provided by remote system 104 may be configured to convert commands issued by hardware resources 150 to modified commands for channel card 154A. The modified commands may invoke user selected non-standard features that may otherwise not have been invoked by the commands. Thus, the modified command may include a non-standard feature customized command.

During configuration process 210 (e.g., at interaction 212), management controller 152 may also provide information regarding the user's preferences to the host system (e.g., via hardware resources 150). The information may indicate to the host system that management controller 152 may potentially modify (e.g., customize) commands issued to channel card 154A with respect to the user selected non-standard features. The host system may use the information to flag potential security issues with respect to modifying such commands and/or for other purposes.

Returning to the performance sound card example, the user may desire to use the data caching and the data processing features of the performance sound card. Remote system 104 may be configured to modify a command that instructs the performance sound card to emit a sound (based on an audio file) from a speaker to a modified (e.g., non-standard feature customized) command that instructs the performance sound card to cache and process the audio file before emitting a sound (based on the processed audio file) from the speaker. Remote system 104 may provide its service based on a set of predetermined criteria, which may include user-specified criteria. For example, the performance sound card may only be instructed to cache and/or process audio files based on characteristics of the audio file (e.g., file size, file type) and/or based on data processing system activity (e.g., usage levels of any of hardware resources 150).

Thus, the processes and interactions shown in FIG. 2A may be used to establish remote command modification services for non-standard channel cards of a data processing system. The remote command modification services may provide for an interface for invoking non-standard features of the non-standard channel cards independently from hardware resources 150 (e.g., using out-of-band methods), while protecting proprietary logic that may be used to modify the commands.

Turning to FIG. 2B, a second interaction diagram in accordance with an embodiment is shown. The second interaction diagram may illustrate flows of data and processing of data that may occur when invoking non-standard features of hardware components of the data processing system.

To determine whether non-standard features of channel card 154A should be invoked, management controller 152 may obtain (e.g., intercept) a command issued to channel card 154A from hardware component 151 of hardware resources 150 of the data processing system. For example, hardware component 151 may include a processor attempting to invoke a feature of channel card 154A via the command.

At interaction 252A, the command may be issued to channel card 154A by hardware component 151 by transmission via a message and/or by other methods. However, management controller 152 may monitor activity of hardware resources 150 (e.g., hardware component 151) and may include functionality for identifying and/or intercepting commands issued to channel card 154A and/or other hardware components of hardware resources 150. For example, management controller 152 may identify and/or intercept the commands transparently (e.g., surreptitiously) to the processor and/or other hardware components of hardware resources 150 via sideband channel 174A.

Thus, at interaction 252, the command may be intercepted by management controller 152 using methods discussed above. Obtaining (e.g., intercepting) the command by management controller 152 may include preventing channel card 154A from receiving the command for at least a period of time, as indicated by the dashed arrow of interaction 252A.

The command issued to channel card 154A by hardware component 151 may not be natively executable by channel card 154A. For example, the command may include instructions for invoking standard features of channel card 154A, but may not include instructions for invoking non-standard features of channel card 154A. Non-standard features of a channel card may include capabilities of the channel card that are additional to those of a standard (e.g., an industry standard) for a type of channel card (e.g., a class of card, such as a sound card, a graphics card, a network card). To determine whether non-standard features of channel card 154A should be invoked, management controller 152 may perform command modification process 254.

During command modification process 254, management controller 152 may screen the command to determine whether the command implicates use of a non-standard feature of channel card 154A. To screen the command, management controller 152 may (i) identify a card type of channel card 154A, and (ii) compare the command to a set of types of commands that are compliant with the standard for the card type (e.g., an industry standard). For example, if the command is a member of the set of types of commands that are compliant with the standard, then management controller 152 may conclude that the command may not implicate use of any non-standard features of channel card 154A. Otherwise, management controller 152 may conclude that the command implicates use of a (e.g., at least one) non-standard feature of channel card 154A.

If the command does not implicate use of any non-standard features of channel card 154A, then management controller 152 may be adapted to allow direct processing of the command by channel card 154A without modification (e.g., management controller 152 may make the command available to channel card 154A). For example, management controller 152 may provide the command to channel card 154A using methods similar to those described with respect to interaction 212 of FIG. 2A and/or by other methods (not shown).

If the command implicates use of a non-standard feature of channel card 154A, then management controller 152 may communicate with remote system 104 in order to modify the command. To do so, during command modification process 254, management controller 152 may request services (e.g., command modification services) from remote system 104. To request the services, management controller 152 may obtain (e.g., generate) a request. The request may include the command and/or other information (e.g., identifying information, cryptographic information, etc.).

At interaction 256, the request may be provided to remote system 104 using methods similar to those described with respect to interaction 206 of FIG. 2A (e.g., via out-of-band channel 172A). Remote system 104 may be operated by an entity different to an operator of the data processing system (e.g., management controller 152, hardware resources 150). For example, remote system 104 may be operated and/or managed by a vendor that manufactured channel card 154A and/or may host proprietary software of the vendor usable to interpret and convert commands for channel card 154A.

Upon obtaining the request (e.g., the command), remote system 104 may identify proprietary software (e.g., that relies on proprietary logic) associated with channel card 154A. The proprietary logic of the proprietary software may be maintained and controlled exclusively by remote system 104 (e.g., the vendor). Remote system 104 may use the proprietary logic (e.g., run proprietary algorithms, use proprietary data) to convert the command to a non-standard feature customized command.

The non-standard feature customized command may be natively executable by channel card 154A. For example, the non-standard feature customized command may include instructions additional (e.g., appended) to existing instructions of the command to obtain the non-standard feature customized command. The non-standard feature customized command may include instructions that may improve the coordinated operation of components of the data processing system in view of non-standard features of channel card 154A.

Returning to the performance sound card example, a processor of the data processing system may issue commands for depowering the data processing system. For example, time-dependent shutdown commands may be issued by the processor to specific hardware components of hardware resources 150 (e.g., power controllers). The time-dependent shutdown commands may be pre-programmed at a time of manufacturing of the data processing system based, at least in part, on the stock hardware components present at the time of manufacturing. However, the performance sound card (not present at the time of manufacturing) may require additional time to perform shut-down related functions associated with its non-standard features. For example, to avoid data loss, the performance sound card may require additional time to clear cached data from memory and/or to offload data to persistent storage.

Therefore, proprietary software for converting commands issued to the performance sound card (e.g., controlled exclusively by remote system 104) may be configured to modify amounts of time specified in the shutdown instructions and/or remote system 104 may instruct management controller 152 to hold intercepted depowering commands for a period of time.

At interaction 258, a response (e.g., including the non-standard feature customized command and/or other information or instructions) may be provided to management controller 152 by remote system 104 using methods similar to those described with respect to interaction 208 of FIG. 2A and/or by other methods. Upon obtaining the response, management controller 152 may read instructions and/or perform other actions. For example, management controller 152 may be equipped with software for managing (e.g., tracking, ordering) commands obtained from remote system 104 and/or other sources (e.g., hardware resources 150) before forwarding/issuing the commands. In other words, management controller 152 may insert the non-standard feature customized command into an execution flow for commands issued to channel card 154A. The execution flow may be modified by management controller 152 using transparently to (e.g., without notifying) channel card 154A.

At interaction 260, the modified command (e.g., the non-standard feature customized command, included in the execution flow) may be provided to channel card 154A by management controller 152 by (i) transmission via a message, (ii) storing in a storage with subsequent retrieval by channel card 154A, (iii) a publish-subscribe system where channel card 154A subscribes to updates from management controller 152 thereby causing a copy of the modified command to be propagated to channel card 154A, and/or (iv) other processes. The modified command may be provided, for example, via sideband channel 174A (e.g., a communication channel similar to sideband channel 174 of FIG. 1B).

Upon obtaining the modified command, channel card 154A may perform execution process 262. During execution process 262, channel card 154A may execute instructions included in the modified command and/or other instructions (e.g., stored locally) to participate in provision of a computer-implemented service. By doing so, a non-standard feature of channel card 154A may be utilized to provide user desired computer-implemented services without re-configuring operation of hardware resources 150.

Thus, the processes and interactions shown in FIG. 2B, non-standard features of channel cards may be invoked using out-of-band methods. To do so, a management controller of a data processing system may communicate with a remote system that manages and controls proprietary logic for performing command modification via out-of-band communication channels. By doing so, the non-standard features may be utilized without providing the data processing system with access to the proprietary logic and without the commands (and/or the modified commands) traversing hardware resources 150 during command modification process 254, thereby reducing a likelihood of compromise of the modified commands and/or hardware resources 150.

While described with respect to a management controller, it will be appreciated that other hardware and/or software configurations may be possible. For example, a piece of software running on the host system (e.g., hardware resources of the data processing system) may perform all or a portion of functions performed by the management controller.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Turning to FIG. 3, a flow diagram illustrating a method in accordance with an embodiment is shown. The flow diagram may illustrate various operations performed while managing operation of a data processing system. The data processing system may include hardware resources and a management controller, and may be similar to the data processing system discussed with respect to FIGS. 1A-1B.

Prior to operation 302, the management controller may be registered with a remote system with respect to a channel card of the data processing system. The remote system may be operated by a vendor that manufactured the channel card, and may be adapted to interpret and convert commands issued to the channel card to obtain non-standard feature customized commands (e.g., commands natively executable by the channel card that invoke non-standard features of the channel card). Therefore, the management controller may be registered with the remote system to facilitate modifying of commands issued to the channel card. For example, by registering, the management controller may subscribe to a command modification service provided by the remote system.

For example, registering the management controller with the remote system with respect to the channel card may include (i) obtaining a registration request, (ii) providing the registration request to the remote system (e.g., via an out-of-band communication channel), (iii) receiving, from the remote system, a response indicating whether the registration request was successful, and/or (iv) other methods. Refer to registration process 204 of FIG. 2A for more details regarding registering of the management controller with the remote system.

Once registered, the management controller may establish (with the remote system) non-standard feature preferences for the channel card. The non-standard feature preferences may be established by performing a configuration process (e.g., configuration process 210 of FIG. 2A) and/or by other methods. The non-standard feature preferences may limit one or more non-standard features of the channel card from use by the remote system when the remote system provides command modification services. For example, the non-standard feature preferences may be based on user input obtained during an interaction between the management controller and a user of the data processing system.

For example, establishing the non-standard feature preferences for the channel card may include (i) obtaining user feedback (e.g., from a user interface presented during an interaction with the user), (ii) parsing the user feedback to identify one or more non-standard feature preferences for the channel card, (iii) providing the one or more non-standard feature preferences to the remote system along with instructions for the remote system to establish restrictions on command modification processes based on the non-standard feature preferences, and/or (iv) other methods. Refer to configuration process 210 of FIG. 2A for more information regarding establishing non-standard feature preferences.

At operation 302, commands issued by the hardware resources may be screened to identify a command that implicates use of a non-standard feature of a channel card of the hardware resources. The non-standard feature may include capability of the channel card that is additional to those of a standard for a type of the channel card, such as an industry standard.

The commands may be screened (e.g., by the management controller) by (i) identifying that hardware resources of the data processing system have issued the commands, (ii) intercepting the commands, and/or (iii) comparing each of the commands to a set of types of commands that are compliant with the standard for the type of the channel card. For example, the management controller may monitor at least a portion of the hardware resources (e.g., via sideband channels of the data processing system) to identify and intercept the issued commands transparently to the hardware resources. If the command is not of a type that is a member of the set of the types of commands, it may be concluded that the command implicates use of a non-standard feature.

For example, the hardware resources may include a processor, and the processor may have issued the commands based on execution of a program thereon. To identify issuance of the commands, the management controller may monitor activity of the processor and may identify a portion of the activity that indicates that the commands have been issued. Information included in the commands (e.g., data packages of instructions) may indicate that the commands may be for execution by a channel card of the data processing system.

Based on the identified activity of the processor, the commands may be intercepted transparently to the hardware resources (e.g., the processor, the channel card). For example, the management controller may perform the screening process independently and surreptitiously from (e.g., without notifying) the hardware resources.

Comparing each of the commands to a set of types of commands may include parsing the commands. For example, the management controller may compare instructions of the commands to instructions of the set of types of commands to identify similar or same instructions. Based on the comparisons, if a command of the commands is not of a type that is a member of the set of the types of the commands (e.g., if no similar or same instructions are identified), then the management controller may conclude that the command implicates the use of the non-standard feature.

The command may not be natively executable by the channel card (e.g., the command may not include instructions recognized by the channel card) and the management controller may be unable to modify the command to be natively executable by the channel card without cooperation of the remote system. For example, the management controller may require access to access restricted proprietary logic in order to modify the command to be natively executable by the channel card.

Concluding that the command implicates the use of the non-standard feature may include (i) labeling (e.g., flagging) the command, (ii) providing the command to another entity responsible for managing command modification processes, and/or (iii) other methods.

At operation 304, the command may be modified to obtain a non-standard feature customized command that is natively executable by the channel card. The command may be modified by the management controller and the remote system. The remote system may interpret (e.g., parse, classify) the command and use the proprietary logic maintained and controlled exclusively by the remote system to convert the command to the non-standard feature customized command. For example, proprietary software (e.g., third-party software that implements the proprietary logic) hosted by the remote system may be executed to (i) append instructions to the command, (ii) replace at least a portion of the command with a modified command, and/or (iii) use other methods to modify the command. The non-standard feature customized command may include instructions that invoke the non-standard feature of the channel card and/or standard features of the channel card.

Modifying the command may include (i) sending at least the command to the remote system via an out-of-band channel of the data processing system, and (ii) receiving the non-standard feature customized command. For example, the management controller may send the command to the remote system and receive the non-standard feature customized command using methods described with respect to interactions 256 and 258 of FIG. 2B, respectively, and/or by other methods.

At operation 306, execution of the non-standard feature customized command by the channel card may be initiated to facilitate provisioning of a computer-implemented service. The execution of the non-standard feature may be initiated by providing the non-standard feature customized command to the channel card using methods similar to those described with respect to interaction 260 of FIG. 2B and/or by other methods. The execution of the non-standard feature customized command may be initiated, at least in part, by the management controller.

Initiating execution of the non-standard feature customized command may include transparently (to the channel card and/or other hardware resources) inserting the non-standard feature customized command into an execution flow for commands issued to the channel card and/or other methods. Transparently inserting the non-standard feature customized command into the execution flow may include (i) adding the non-standard feature customized command to the execution flow (e.g., via modifying a data structure), (ii) modifying existing commands in the execution flow, (iii)

providing the non-standard feature customized command and instructions to another entity responsible for managing the execution flow, and/or (iv) performing other actions.

The computer-implemented service may be facilitated and/or provided, in part, upon execution of at least a portion of the instructions included in the non-standard feature customized command by the channel card. For example, the channel card may execute the instructions included in the non-standard feature customized command in cooperation with execution of other instructions by other hardware resources of the data processing system to provide the computer-implemented service.

The method may end following operation 306.

Thus, as illustrated above, embodiments disclosed herein may provide systems and methods usable to manage operation of a data processing system using a remote service (e.g., via a remote system that hosts proprietary (third-party) software) adapted to facilitate use of non-standard features of hardware components of the data processing system. Since the proprietary software may be restricted from local use by the data processing system, the remote system may offer a service based on the proprietary software, which may be accessed by the data processing system using out-of-band methods. By doing so, the non-standard features may be utilized when providing computer-implemented services in a manner that does not require local access to the proprietary software and that reduces a likelihood of compromise of the data processing system.

Thus, embodiments disclosed herein may provide an improved computing device that is able to invoke non-standard features of hardware components in a manner that reduces a likelihood of interruptions to the computer-implement services, and that reduces risk associated with installation of (proprietary) third-party software to the host system. Accordingly, the disclosed process provides for both an embodiment in computing technology and an improved method for managing operation of the data processing system.

Figure 4:
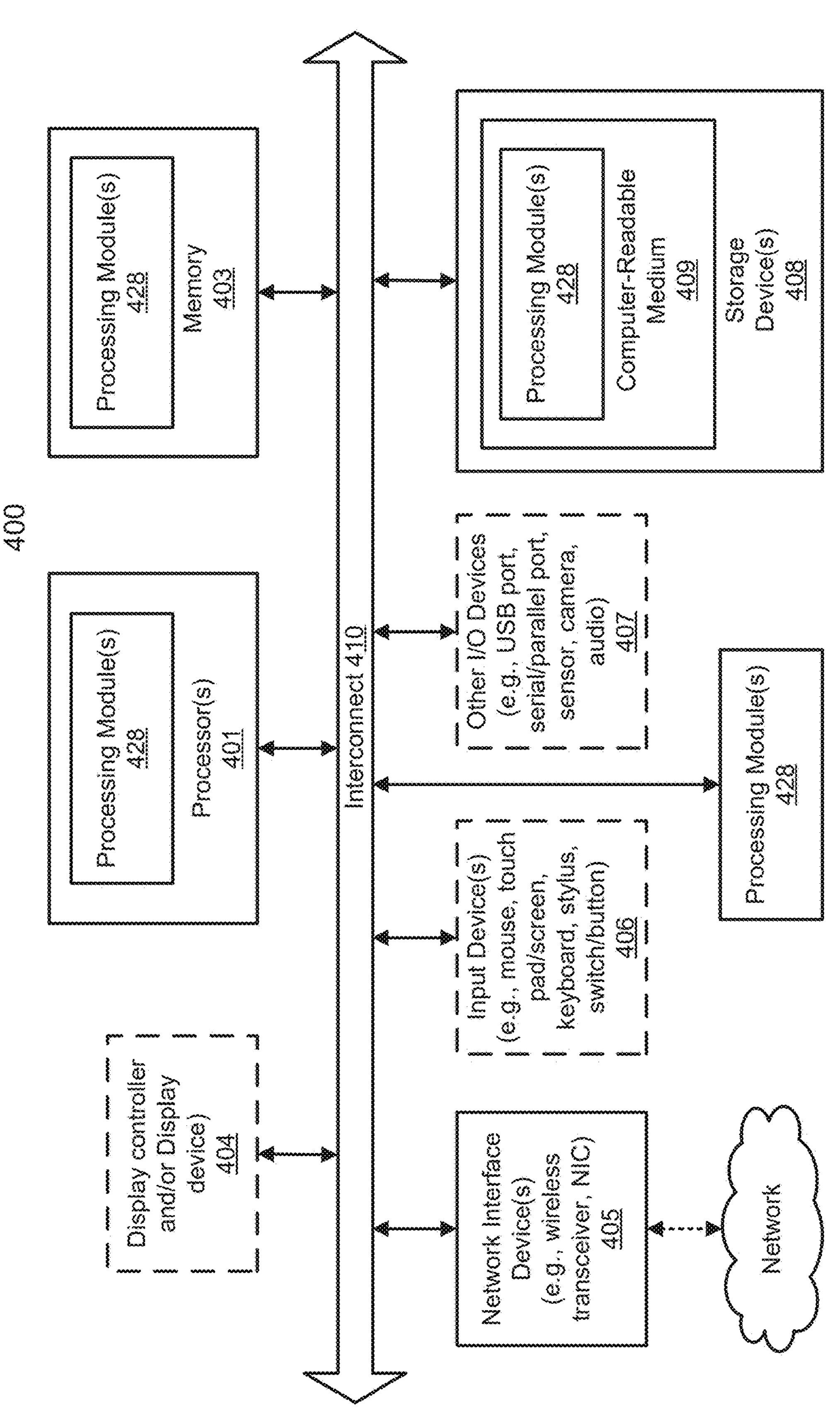
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term “machine” or “system” shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as Vx Works.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:

screening, by a management controller of the data processing system, commands issued by hardware resources of the data processing system to identify a command that implicates use of a non-standard feature of a channel card of the hardware resources;

modifying, by the management controller and a remote system, the command to obtain a non-standard feature customized command that is natively executable by the channel card; and initiating, by the management controller, execution of the non-standard feature customized command by the channel card to facilitate provisioning of a computer-implemented service, wherein prior to screening the commands and by the management controller, the method further comprises:

registering the management controller with the remote system with respect to the channel card to facilitate the modifying of the command; and establishing, by the management controller and with the remote system, non-standard feature preferences for the channel card, the non-standard feature preferences limiting at least one non-standard feature of the channel card from use by the remote system during the modifying of the command.

2. The method of claim 1, wherein the command is not natively executable by the channel card, and the management controller is unable to obtain the non-standard feature customized command without cooperation of the remote system.

3. The method of claim 2, wherein the remote system is adapted to interpret and convert the command to obtain the non-standard feature customized command.

4. The method of claim 3, wherein the remote system is a system operated by a vendor that manufactured the channel card.

5. The method of claim 2, wherein in the command is converted to the non-standard feature customized command using proprietary logic maintained and controlled exclusively by the remote system.

6. The method of claim 2, wherein other commands of the commands are natively executable by the channel card, and the management controller is adapted to allow direct processing of the other commands by the channel card without modification.

7. The method of claim 1, wherein the non-standard feature is a capability of the channel card that is additional to those of a standard for a type of the channel card.

8. The method of claim 7, wherein screening the commands comprises:

comparing each of the commands to a set of types of commands that are compliant with the standard for the type of the channel card; and in an instance of the comparing where the command is not of a type that is a member of the set of the types of the commands:

concluding that the command implicates the use of the non-standard feature.

9. The method of claim 1, wherein modifying the command comprises:

sending, by the management controller, at least the command to the remote system via an out-of-band channel; and receiving, by the management controller, the non-standard feature customized command.

10. The method of claim 1, wherein initiating execution of the non-standard feature customized command comprises:

transparently, to the channel card, inserting the non-standard feature customized command into an execution flow for commands issued to the channel card.

11. The method of claim 1, wherein the management controller is separate from and tasked with managing operation of the hardware resources, and the management controller monitors at least a portion of the hardware resources to identify and intercept the issued commands transparently to the hardware resources.

12. The method of claim 1, wherein the non-standard feature preferences are based on user input obtained during an interaction between the management controller and a user of the data processing system, the user desiring the computer-implemented service to be provided.

13. A non-transitory machine-readable medium having instructions stored therein, which when executed by a processor, cause the processor to perform operations for managing operation of a data processing system, the operations comprising:

screening, by a management controller of the data processing system, commands issued by hardware resources of the data processing system to identify a command that implicates use of a non-standard feature of a channel card of the hardware resources;

modifying, by the management controller and a remote system, the command to obtain a non-standard feature customized command that is natively executable by the channel card; and initiating, by the management controller, execution of the non-standard feature customized command by the channel card to facilitate provisioning of a computer-implemented service, wherein prior to screening the commands and by the management controller, the operations further comprise:

registering the management controller with the remote system with respect to the channel card to facilitate the modifying of the command; and establishing, by the management controller and with the remote system, non-standard feature preferences for the channel card, the non-standard feature preferences limiting at least one non-standard feature of the channel card from use by the remote system during the modifying of the command.

14. The non-transitory machine-readable medium of claim 13, wherein the command is not natively executable by the channel card, and the management controller is unable to obtain the non-standard feature customized command without cooperation of the remote system.

15. The non-transitory machine-readable medium of claim 14, wherein the remote system is adapted to interpret and convert the command to obtain the non-standard feature customized command.

16. The non-transitory machine-readable medium of claim 15, wherein the remote system is a system operated by a vendor that manufactured the channel card.

17. A data processing system, comprising:

a processor;

a management controller that is separate from the processor; and a memory coupled to the management controller to store instructions, which when executed by the management controller, cause the management controller to perform operations, the operations comprising:

screening, by the management controller of the data processing system, commands issued by hardware resources of the data processing system to identify a command that implicates use of a non-standard feature of a channel card of the hardware resources;

modifying, by the management controller and a remote system, the command to obtain a non-standard feature customized command that is natively executable by the channel card; and initiating, by the management controller, execution of the non-standard feature customized command by the channel card to facilitate provisioning of a computer-implemented service, wherein the data processing system comprises a single network module that separately advertises network endpoints for the management controller and the hardware resources of the data processing system such that first communications meant for the hardware resources never flow through the management controller and second communications meant for the management controller never flow through the hardware resources.

18. The data processing system of claim 17, wherein the command is not natively executable by the channel card, and the management controller is unable to obtain the non-standard feature customized command without cooperation of the remote system.

19. The data processing system of claim 18, wherein the remote system is adapted to interpret and convert the command to obtain the non-standard feature customized command.

20. The data processing system of claim 17, the operations further comprising:

prior to screening the commands and by the management controller:

registering the management controller with the remote system with respect to the channel card to facilitate the modifying of the command; and establishing, by the management controller and with the remote system, non-standard feature preferences for the channel card, the non-standard feature preferences limiting at least one non-standard feature of the channel card from use by the remote system during the modifying of the command.

* * * * *